United States Patent [19]
Kelley et al.

[11] Patent Number: 5,582,074
[45] Date of Patent: Dec. 10, 1996

[54] PARK BRAKE CABLE END FITTING

[75] Inventors: Larry W. Kelley, Troy; Grant A. Webb, Howell; Joseph M. Laperriere, III, Chesterfield, all of Mich.

[73] Assignee: Teleflex Incorporated, Troy, Mich.

[21] Appl. No.: 504,523

[22] Filed: Jul. 20, 1995

[51] Int. Cl.$^6$ ..................................... F16C 1/14
[52] U.S. Cl. ........................................ 74/502.4
[58] Field of Search ......................... 74/502.4–502.6; 403/329, 330, 252

[56] References Cited

U.S. PATENT DOCUMENTS

| | | |
|---|---|---|
| 3,139,768 | 7/1964 | Biesecker . |
| 3,221,572 | 12/1965 | Swick . |
| 3,415,549 | 12/1968 | Chatham . |
| 3,528,313 | 9/1970 | Berno .................... 74/502.4 |
| 3,542,980 | 11/1970 | Hamilton .............. 403/252 X |
| 4,074,945 | 2/1978 | Kraus et al. . |
| 4,304,148 | 12/1981 | Hamman ................ 74/502.4 |
| 4,304,149 | 12/1981 | Heimann . |
| 4,534,239 | 8/1985 | Heimann ................ 74/502.4 |
| 4,621,937 | 11/1986 | Maccuaig ............ 74/502.4 X |
| 4,955,252 | 9/1990 | Clissett et al. .......... 74/502.4 |
| 5,337,621 | 8/1994 | Spease .................... 74/502.4 |

Primary Examiner—Charles A. Marmor
Assistant Examiner—Mary Ann Battista
Attorney, Agent, or Firm—Howard & Howard

[57] ABSTRACT

A motion transmitting remote control assembly for park brake applications includes a conduit slidably supporting a core element and having an end fitting disposed on each end of the conduit. The end fitting includes a seal body formed of a relatively resilient organic polymeric material and a frame disposed about the seal body and formed of a different and relatively more rigid organic polymeric material and having a plurality of snap-in locking fingers to engage behind a surface of a support structure upon advancing the locking fingers through an aperture of the support structure. A connector member is molded from an organic polymeric material in place simultaneously about each of the seal body and frame and about the end of the conduit to provide an interconnection therebetween and to provide a transverse abutment surface spaced longitudinally from bearing surfaces of the snap-in locking fingers for engaging an opposite surface of the support structure.

17 Claims, 3 Drawing Sheets

PARK BRAKE CABLE END FITTING

TECHNICAL FIELD

This invention relates to motion transmitting remote control assemblies of the type having a conduit and flexible motion transmitting core element slidably supported within the conduit for transmitting motion along a curved path, and more particularly to end fittings for the ends of the conduit of such fittings.

BACKGROUND OF THE INVENTION

Various end fittings for brake cable assemblies, such as those utilized in automotive park brake applications, have been developed that enable the ends of the conduit to be secured to support structure, i.e., a mounting bracket, of the vehicle upon inserting the end fitting through a preformed aperture in the support structure. Such end fittings typically include an inner seal body member for wipingly engaging the end of the core element extending from the end of the conduit. The seal body member is housed within a snap-in fastening component typically fabricated of metal, which in turn is secured to the conduit by crimping or otherwise deforming the connector around the outer sheath of the conduit.

Inherently, the metal components are subject to corrosion and in the case of the snap-in fastening portion, it is sometimes difficult to control the physical properties of the material such that an unacceptable variation in the force required to insert the end fitting through the aperture can occur. The crimping of the metal connector about the conduit also is problematic in that it can damage an inner liner of the conduit and inhibit smooth operation of the core element therein and further can destroy or greatly limit the effectiveness of any protective coatings that may have been applied to the connector and cable for corrosion protection.

The prior U.S. Pat. No. 4,304,149 to Heimann, issued Dec. 8, 1981, discloses a plastic end fitting whose connector is preformed apart from the conduit and then engaged with an interference fit about the conduit. Although the plastic material is lighter in weight than the aforementioned metal components and is less susceptible to corrosion, the Heimann fitting is structurally weak.

SUMMARY OF THE INVENTION AND ADVANTAGES

According to the invention, a motion transmitting remote control assembly comprises a conduit having opposite ends and a bore extending between the opposite ends and a flexible core element slidably supported within the bore of the conduit having end portions thereof extending from the ends of the conduit. A core element seal body formed of a relatively resilient first organic polymeric material has a bore aligned in axial prolongation of the conduit bore at one end of the conduit in which an associated end portion of the core element is slidably supported. The core of the seal body has a wiper portion that wipingly engages the extended end portion of the core element. A frame is formed separately from the seal body out of a second organic polymeric material that is relatively more rigid than the first organic polymeric material and is disposed about the seal body. The frame includes at least one resiliently deflectable snap-in locking portion deflectable radially of the frame in a first direction upon advancing the locking portion through an aperture extending between opposite sides of a support structure to which the assembly is to be mounted, and returning upon full advancement in the locking portion through the aperture to bring a bearing surface of the locking portion into engagement with one side of the support structure. The invention is characterized by including a connecting member molded from an organic polymeric material in place about the end of the conduit and about an end of the seal body and an end of the frame to secure the seal body and frame to the conduit and defining a transverse abutment surface on the connector opposite the bearing surface of the locking portion to confront the opposite side of the support structure.

The all-plastic construction is lighter in weight and more corrosion resistant than the aforementioned metal components of the prior art devices, and the over-molded connector provides greater strength and integrity to the construction, and better performance, as compared to the known prior art plastic end fittings.

THE DRAWINGS

These and other features and advantages of the invention will become more readily understood and appreciated by those skilled in the art when considered in connection with the following detailed description and drawings, wherein.

DETAILED DESCRIPTION

Figure 1:
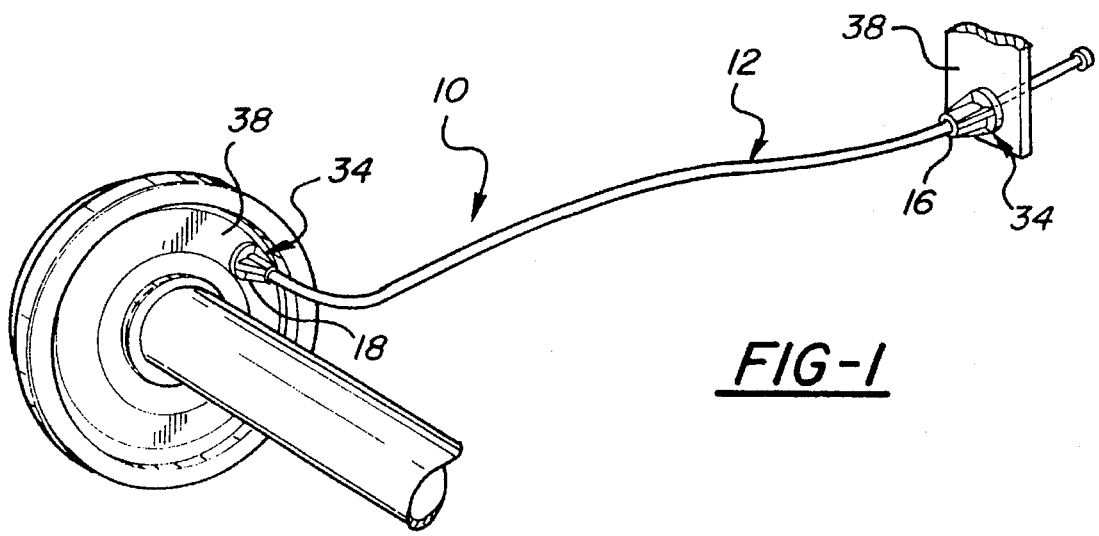
FIG. 1 is a fragmented illustration of a motion transmitting remote control assembly of the present invention shown attached at opposite ends of the conduit to support structures of a vehicle.

A presently preferred embodiment of the invention is illustrated in the drawings and comprises a motion transmitting remote control assembly 10 having a conduit 12 with a longitudinal bore therein extending between opposite ends 16, 18. The conduit 12 may comprise any one of various constructions well known in the art, including a Bowden-type wrapped metal conduit, but preferably is of the type having an inner tubular liner 20 of low friction organic polymeric material, such as nylon, encased in a helical wrap of long lay wires 22 which in turn may be wrapped with one or more additional fine wires (not shown) and including an outer casing or sheath 24 of organic polymeric material extruded about the long lay wires 22.

A flexible motion transmitting core element 26 is disposed slidably within the bore 14 of the conduit 12 and has end portions 28 that extend from the ends 16, 18 of the conduit. As best shown in FIGS. 4 and 7–9, the core element 26 may be of the type well known to the brake cable art having an inner metal strand core portion encased in an outer sleeve of any of a number of conventional, well known low friction organic polymeric materials, such as PTFE, or nylon.

At least one and preferably both ends 16, 18 of the conduit 12 are provided with an end fitting 34 each being mountable within an aperture 36 of a plate-like support structure 38 of a vehicle, such as the frame of the vehicle at one end and a housing of a brake drum at the other end of the conduit 12.

As will be explained in greater detail below, the end fitting 34 is formed entirely of organic polymeric material and comprised of three primary components, namely a seal body 40, a frame 42, and a connector 44 molded in situ about the seal body and frame 40, 42 and about an end of the conduit 12.

Figure 4:
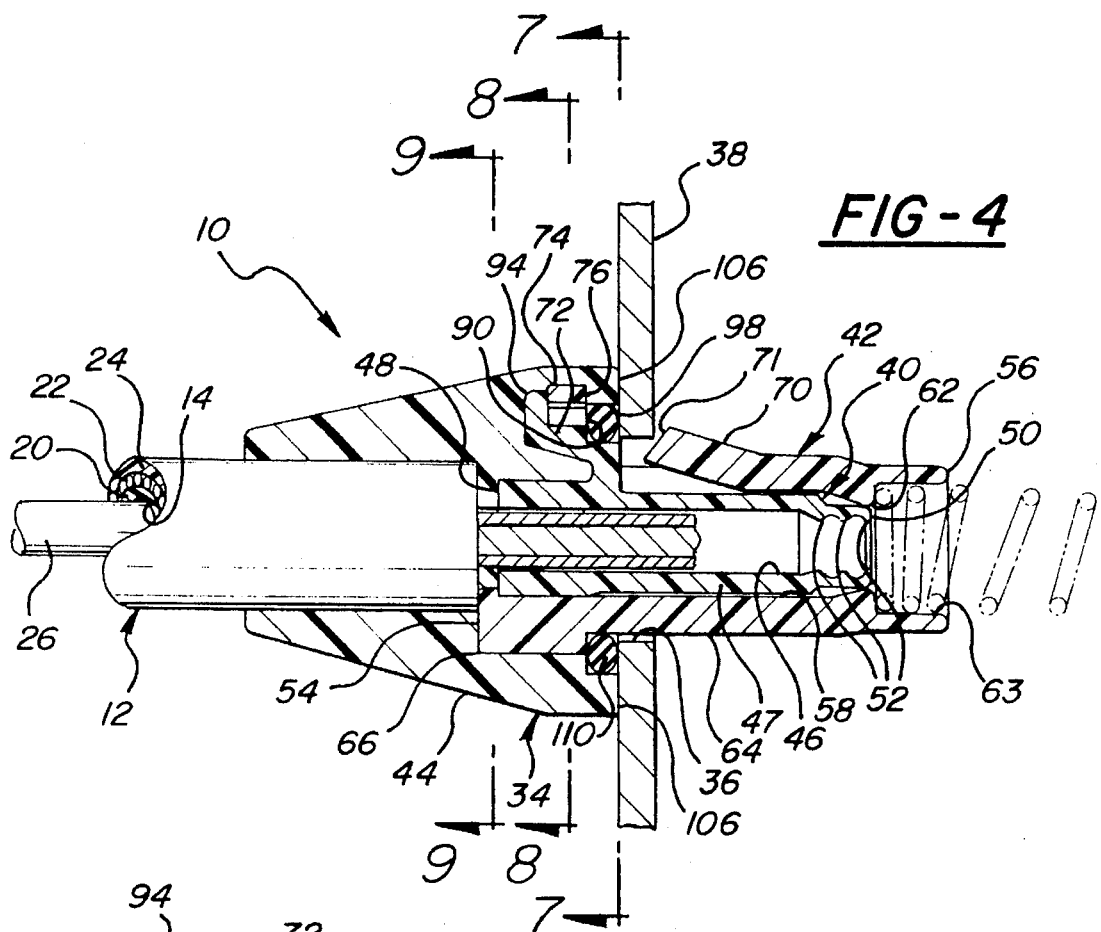
FIG. 4 is a longitudinal cross-sectional view of the assembly portion like that in FIG. 3 but including a core element and an O-ring seal.
Figure 5:
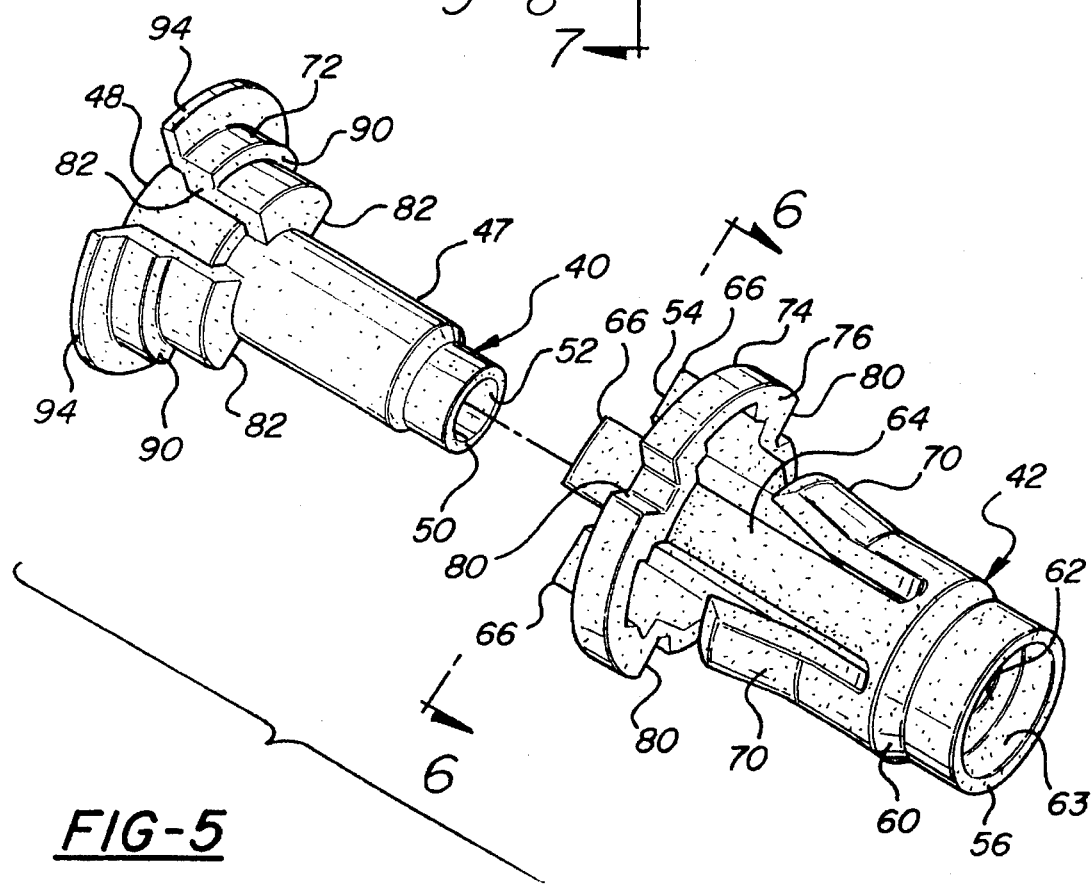
FIG. 5 is an exploded view of the cable seal body and fastening components.
Figure 6:
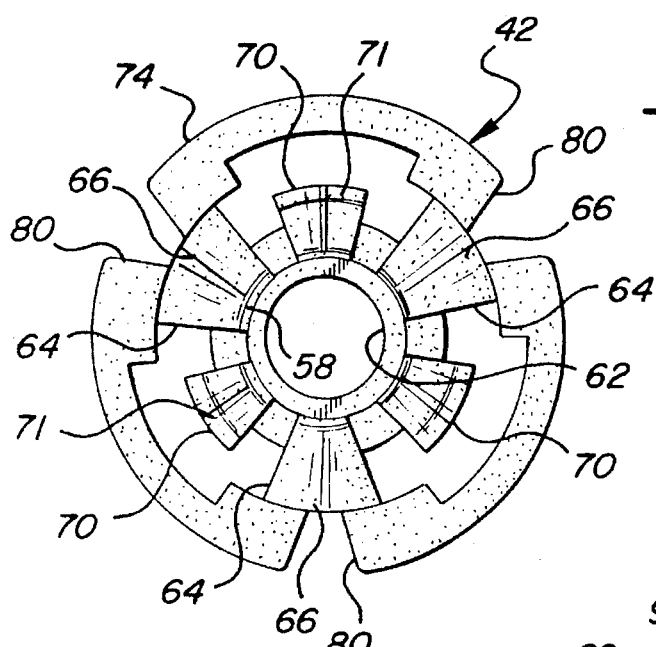
FIG. 6 is an end view of the frame taken along lines 6—6 of FIG. 5.

As shown best in FIGS. 4 and 5, the seal body 40 comprises an elongate tubular portion 47 having a central bore 46 extending longitudinally between opposite first 48 and second 50 ends of the seal body 40. The tubular portion 47 has a substantially uniform wall thickness dimensioned to resist buckling as the core element is drawn into the conduit 12. As seen in FIG. 4, the bore 46 of the seal body 40 is aligned in axially prolongation of the conduit bore 14 at an associated end of the conduit 12. The bore 46 of the seal body 40 is of the same diameter as the bore 14 of the conduit 12 along the majority of its length so as to slidably support the core element 26 with little frictional resistance. However, the bore 46 has a wiper portion 52 that is of slightly less diameter than that of the core element 26 and the seal body 40 is formed of a relatively resilient first organic polymeric material, such as 66 Nylon modified with natural rubber for wipingly engaging the core element 26 as it slides through the wiper portion 52 to remove any debris from the core element to prevent it from entering the interior of the end fitting 34. As shown best in FIG. 4, the wiper portion 52 comprises at least one and preferably a plurality of annular ribs projecting radially inwardly of the bore 46 at longitudinally spaced intervals adjacent the second end 50 of the seal body 40. The size of the wiper portion 52 should be small enough in relation to the diameter of the core element 26 as to provide seal body engagement to remove debris and moisture, but should not be so small as to interfere to any significant degree with the ability of the core element 26 to slide freely within the bores 14 and 46 of the conduit 12 and seal body 40 during operation. Further, the resiliency of the material selected for the seal body 40 should be high enough to provide seal body engagement with the core element 26 but yet be sufficiently strong and self supporting to prevent the seal body 40 from buckling as the core element 26 is drawn into the seal body 40 through the second end during operation placing a compressive load on the seal body 40. The aforementioned preferred material provides such properties. In addition, it may be desirable to form the wiper portion 52 of a smaller wall thickness than the remainder of the tubular portion 47 to increase flexibility in the area of the wiper portion for enhanced sealing ability yet retain the necessary column strength of the tubular portion 47.

The frame 42 is formed as a separate component from the seal body 40 out of a second organic polymeric material such as glass-filled nylon that is relatively more rigid than that of the seal body material. The frame 42 has a cage-like construction having longitudinally spaced first 54 and second 56 ends, and a central socket 58 extending longitudinally between the ends 54, 56. As shown best in FIGS. 4 and 5, the frame 42 has an annular opening 62 at the second end 56. The opening 62 has a diameter that is approximately equal to the outer diameter of the seal body 40, and completely surrounds the wiper portion 52 of the seal body 40 to prevent deformation of the softer material in the event the core element 26 is forced to move at skewed angles to the axis of the conduit bore 14. An integral spring seat 63 extends from the second end 56 of the frame 42 to retain a compression spring as shown in phantom in FIG. 4.

A plurality of circumferentially spaced support legs 64, and preferably three such legs spaced equal distance from one another, extend from the annular base portion 60 longitudinally to free ends 66 at the first end 54 of the frame 42. The legs 64 are rigid and define within their inner boundary the socket 58.

Figure 2:
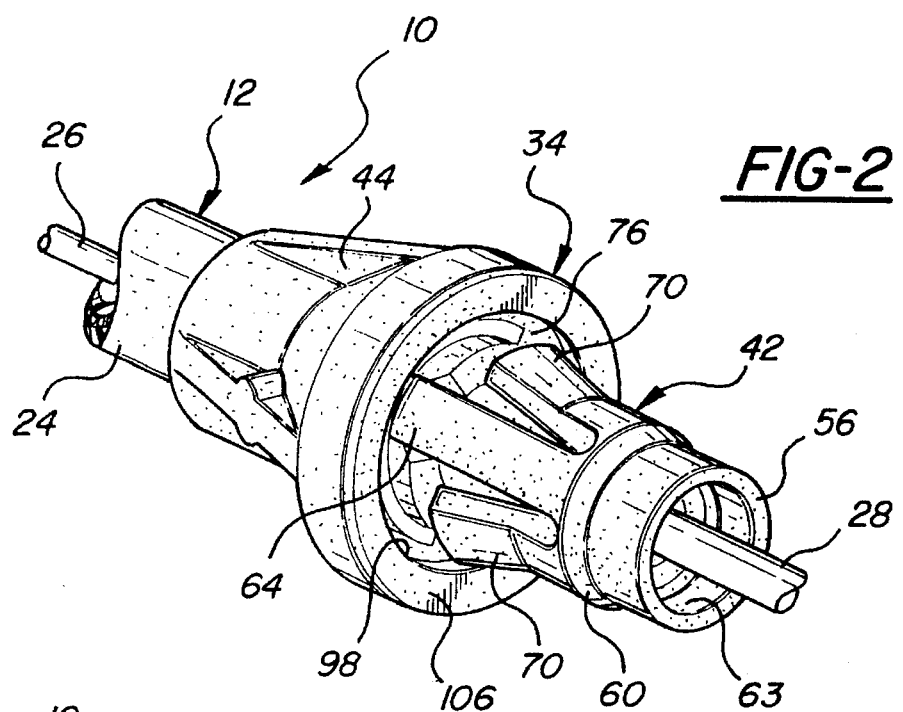
FIG. 2 is an enlarged perspective view of one end of the assembly.
Figure 3:
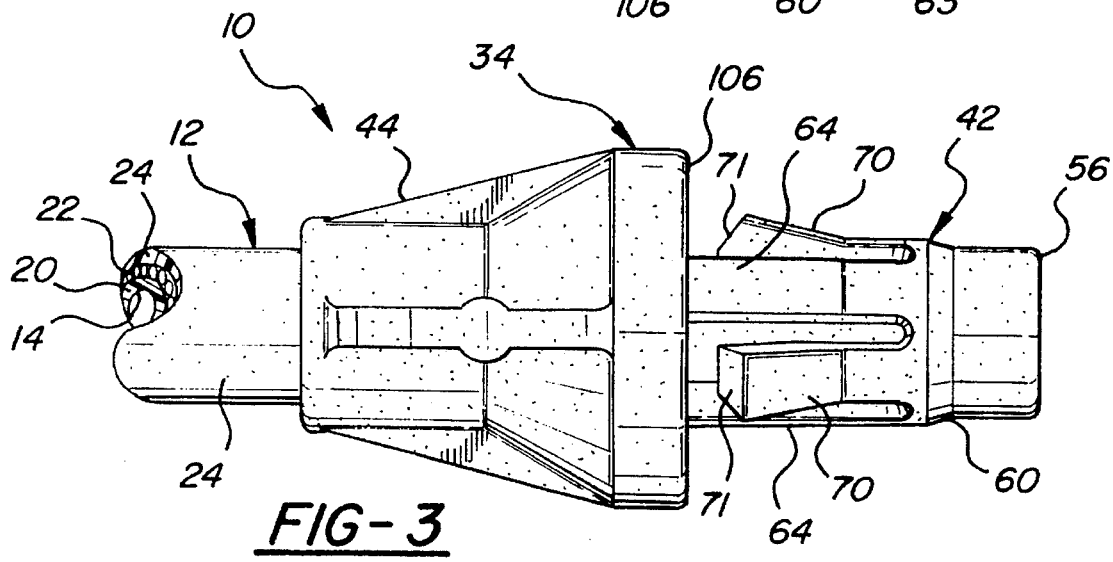
FIG. 3 is a side view of the assembly portion illustrated in FIG. 2.

As illustrated in FIGS. 2–4, the frame 42 is disposed about the seal body 40 such that the tubular portion 47 of the seal body 40 is supported within the socket 58 of the frame 42 and the wiper portion 52 is recessed within the opening 62 for protection. The support legs 64 engage the outer surface of the tubular portion 47 and thereby provide radial support to the seal body 40.

As mentioned, the seal body 40 and frame 42 are formed as separate components from two different materials. Once formed, they are brought into engagement with one another by extending the tubular portion 47 longitudinally into the socket 58 of the frame 42 through the first end 54 of the frame 42, prior to molding the connector 44 about the seal body and frame 40, 42 and the end of the conduit 12.

The frame 42 includes a plurality of snap-in locking portions in the preferred form of deflectable spring fingers 70 that extend from the annular base portion 60 between but circumferentially spaced from each adjacent pair of the support legs 64 in cantilevered fashion toward the first end 54 of the frame 42 and terminating at bearing surfaces 71 angled to accommodate dimensional variations in the support structure 38 thickness and aperture 36 diameter. Alternatively, the bearing surfaces 71 could be disposed in a common plane transverse to a longitudinal axis of the frame 42. As illustrated in FIGS. 2–5, the spring fingers 70 project radially outwardly beyond the outer surface of the adjacent portions of the support legs 64.

As shown best in FIGS. 4 and 5, the first ends 48, 54 of the seal body 40 and frame 42 have radially enlarged retaining portions 72, 74. The enlarged portions 74 of the frame 42 is in the form of an annular flange 74 that extends circumferentially about and interconnects the support legs 64 at a location longitudinally spaced from the free ends 66 of the support legs 64. The flange 74 has opposing front 76 and back surfaces that are parallel and disposed transverse to the longitudinal axis of the frame 42 and including at least one and preferably three radially recessed notches 80 therein for plastic flow passages during molding. The front surface 76 forms a portion of an O-ring seat, as will be described in greater detail subsequently.

The radially enlarged retaining projections or portions 72 of the seal body 40 comprise a plurality of circumferentially spaced retaining ears having openings 82 therebetween corresponding in number and arrangement to that of the support legs 64, and having a transverse cross-sectional shape and size corresponding substantially to the cross-sectional shape and size of the portions of the support legs 64 extending beyond the retaining flange 74 of the frame 42. As illustrated best in FIGS. 4 and 7, the support legs 64 of the frame 42 extend longitudinally through and fill the openings 82 of the seal body 40, when the seal body 40 is assembled with the frame 42, such that the free ends 66 of the support legs 64 are spaced longitudinally from the retaining ears 72 and the retaining flange 74 of the seal body 40 and fastening 42 members defining receiving area between the extended support leg sections 64 for the lay wires 22 of the conduit 12.

As illustrated best in FIGS. 4 and 5, the retaining ears 72 have radially stepped profile having a smallest diameter portion 76 extending forwardly beyond the front surface 76 of the retaining flange 74 when the seal body 40 is assembled with the frame 42, an intermediate portion of relatively larger diameter than the portion disposed in coplanar underlying relation to the flange 74, defining a portion of an O-ring seat 90 disposed in a common plane with the front surface 76 of the flange 74. A shoulder 94 is disposed in abutting relation to the back surface of the flange 74, to limit the extent to which the seal body 40 can be inserted into the socket 58 of the frame 42 and to support the seal body 40 against further movement in the longitudinal direction of insertion relative to the frame 42. In other words, abutment of the shoulder 94 and flange 74 defines a fully assembled condition between the seal body 40 and frame 42. However, those skilled in the art will readily appreciate other alternative designs to establish a fully assembled condition between the two components, such as an interlocking feature molded between the seal body 40 and fastening 42 members in the area of the second ends 50, 56.

After forming the individual (loose piece) seal body 40 and frame 42 and assembling them together in the manner described, they are secured to the conduit 12 in the following manner. As illustrated in FIG. 4, the sub-assembly of the seal body 40 and frame 42 are positioned, together with a stripped end of the conduit 12, into a die cavity of a plastic injection mold. The connector 44 is thereafter molded simultaneously about both the seal body 40 and frame 42 and the conduit 12 to provide a sealed interconnection therebetween. The free ends 66 of the support legs 64 present a stop surface against which the tip of the conduit 12 is placed to properly locate the conduit 12 with respect to the seal body 40 and frame 42 during the over-molding of the connector 44. Although not shown, a portion of the sheath 24 be stripped away exposing a predetermined length of the long lay wires 22. Thus, the combination of the support legs 64 and the surrounding connector 44 serve to provide circumferentially continuous outward radial and longitudinal support to the long lay wires 22. Molding the connector 44 about the outer organic polymeric sheath 24 of the conduit 12 is enhanced by a chemical bond therebetween providing a high strength, water tight connection.

Figure 7:
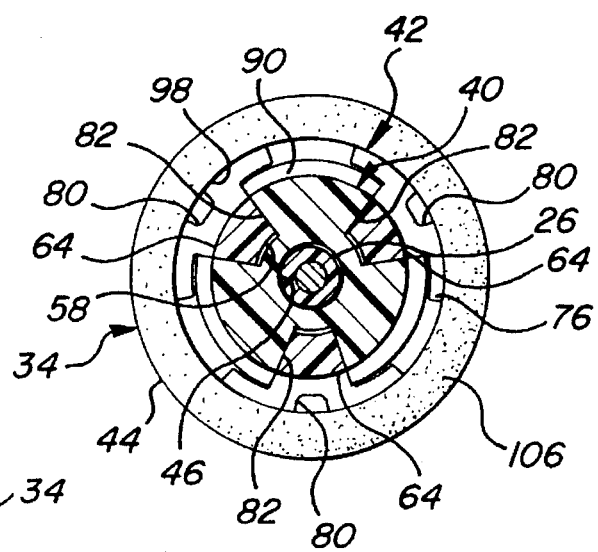
FIG. 7 is a cross-sectional view taken across lines 7—7 of FIG. 4 but omitting the O-ring seal.
Figure 8:
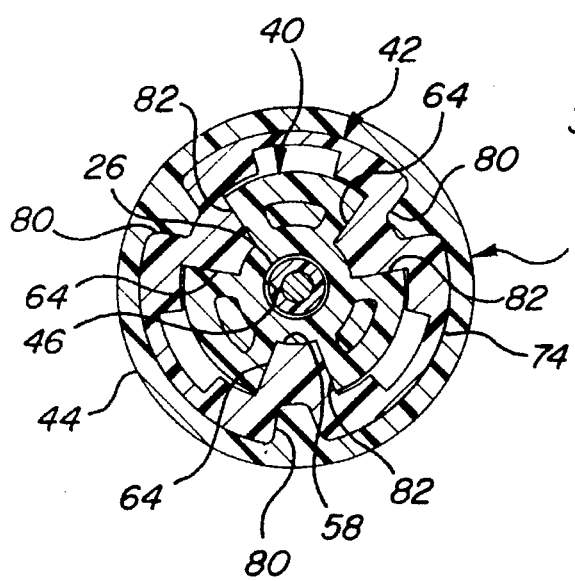
FIG. 8 is a cross-sectional view taken along lines 8—8 of FIG. 4.
Figure 9:
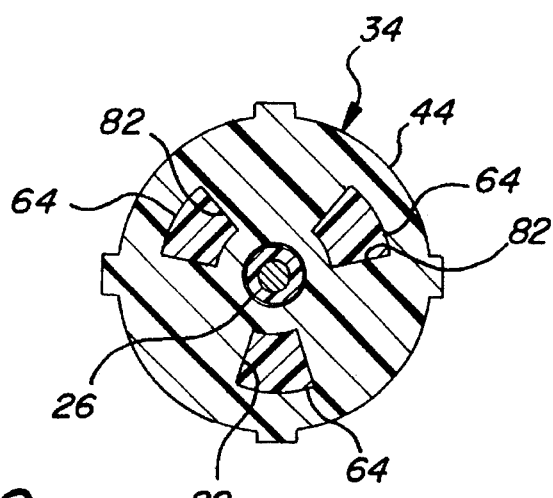
FIG. 9 is a cross-sectional view taken along lines 9—9 of FIG. 4.

As mentioned, the connector 44 is molded to engage both the seal body 40 and frame 42. As illustrated best in FIG. 4, the connector 44 is formed with an interlocking lip 98 in which the retaining ears 72 and retaining flange 74 of the seal body 40 and frame 42 are captured to secure the seal body 40 and frame 42 against longitudinal movement relative to the connector 44. The interlocking lip 98 includes a transverse abutment surface 106 disposed in longitudinally spaced opposing relation to the bearing surfaces 71 of the spring fingers 70, with the distance between the abutment and bearing surfaces 106, 71 corresponding generally by design to the thickness of the support structure 38 to which the end fitting 34 is mounted. The specific dimensions of the interlocking lip 98 and abutment surface 106 are designed, relative to the seal body 40 and fastening 42 members, to form an O-ring pocket. A resilient O-ring seal 110 may be disposed within the pocket and may be formed of any of a number of resilient materials normally utilized in O-ring applications for sealing, such as Nytral. FIGS. 2 and 7 show the ring seal 100 removed from the pocket. The O-ring seal 110 has a predetermined thickness that is relatively greater than the depth of the pocket such that a portion of the seal 110 extends out the pocket, i.e., beyond the abutment surface 106, when in an unreformed condition. The O-ring seal 110 also has a predetermined volume that is relatively less than the volume of the pocket to enable the O-ring seal 110 to be deformed under a compression load fully into the pocket.

In use, the end fitting 34 is mounted in the aperture 36 of the support structure 38, such as a frame of a vehicle or the housing of a brake drum for automotive park brake applications. The connection is made by advancing the spring fingers 70 of the frame 42 longitudinally through the aperture 36 which, because of its relatively smaller diameter, causes the spring fingers 70 to initially deflect radially inwardly and then outwardly as the fingers 70 pass through the aperture 36, bringing the bearing surfaces 71 of the spring fingers 70 into locking engagement with a back side surface of the support structure 38. As the spring fingers 70 are about to pass through the aperture 36, the O-ring seal 110 engages a front side surface of the support structure 38 to encircle and seal off the aperture 36. Further advancement of the spring fingers 70 causes the O-ring seal 110 to be compressed between the support structure 38 and the exposed portions of the flange 74 and O-ring seat 90. The relatively larger volume of the pocket enables the O-ring seal 110 to deform under the compression load into the pocket until the abutment surface 106 of the connector 44 confronts the front side surface of the support structure 38. The engagement of the abutment surface 106 with the support structure 38 preferably occurs at about the same time as the spring fingers 70 pass through the aperture 36. The engagement of the abutment surface 106 with the support structure 38 prevents any further deformation of the O-ring seal 110, and thus isolates the seal 110 against excessive compressive loads during operation while enabling the O-ring seal 110 to maintain a seal between the end fitting 34 and the support structure 38.

The force required to insert the end fitting 34 through the aperture 36 into full engagement with the support structure 38 requires only about twelve foot pounds of force and thus requires little effort to install.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed:

1. A motion transmitting remote control assembly for transmitting motion along a curved path, said assembly comprising: a flexible conduit (12) having opposite ends and a bore extending between said opposite ends, said ends adapted for retention in an aperture (36) of a support structure (38); a flexible core element (26) slidably supported within said bore of said conduit (12) and having an exposed length extending from said bore of said conduit (12); a seal body (40) formed of a relatively resilient first organic polymeric material and extending from one of said conduit (12) ends, said seal body (40) including a wiper portion (52) wipingly engaging said exposed length of said core element (26); a frame (42) disposed about said seal body (40) and including at least one spring finger (70) deflectable radially upon advancement of said frame (42) through the aperture (36) in the support structure (38) to retain said conduit (12) in an operative position on the support structure (38), said frame (42) formed of a second organic polymeric material more rigid than said first organic polymeric material; and characterized by a connector (44) having a transverse abutment surface (106) for engaging the support structure (38) and capturing the support structure (38) against said spring finger (70), said connector molded from an organic polymeric material simultaneously about said conduit (12) and said seal body (40) and said frame (42) to secure said seal body (40) and said frame (42) to said conduit (12) as a moisture impervious unit; said connector (44) having longitudinally spaced apart retaining surfaces, said seal body (40) and said frame (42) including retaining portions captured between said retaining surfaces of said connector (44) to secure said seal body (40) and said frame (42) against longitudinal movement relative to said connector (44).

2. The assembly of claim 1 wherein said wiper portion has a wall thickness, further characterized by said seal body (40) including an elongated tubular portion (47) extending from said wiper portion (52) and having a wall thickness greater than that of said wiper portion (52).

3. The assembly of claim 2 further characterized by said wiper portion (52) of said seal body (40) being circumferentially supported by said frame (42).

4. The assembly of claim 1 further characterized by said frame (42) including an integral spring seat (63).

5. The assembly of claim 1 wherein said spring finger (70) includes a bearing surface (71) for engaging said support structure (38), further characterized by said bearing surface (71) being angled relative to an axis defined by said bore of said conduit (12).

6. The assembly of claim 1 further characterized by including an annular pocket radially adjacent said transverse abutment surface of said connector (44).

7. The assembly of claim 6 further characterized by said pocket having a predetermined depth and volume.

8. The assembly of claim 7 further characterized including a resilient ring seal (110) disposed within said pocket.

9. The assembly of claim 8 further characterized by said ring seal (110) having a predetermined thickness relatively greater than said depth of said pocket such that said ring seal (110) extends out of said pocket when in an undeformed condition, and said ring seal (110) having a predetermined volume relatively less than said volume of said pocket to enable said ring seal (110) to be deformed into said pocket.

10. The assembly of claim 1 further characterized by said retaining surfaces of said connector (44) including a lip (98) and said retaining portions of said seal body (40) and said frame (42) comprising radially outwardly extending projections disposed in mechanical interlocking engagement with said lip (98).

11. The assembly of claim 10 further characterized by said projection of said seal body (40) having a transverse shoulder and said projection of said frame (42) having an opposing transverse shoulder engaging said shoulder of said seal body (40) to support said seal body (40) against movement in one longitudinal direction relative to said frame (42).

12. The assembly of claim 11 further characterized by said retaining portion of said seal body (40) comprising a plurality of retaining ears (72) spaced circumferentially from one another defining openings (82) therebetween.

13. The assembly of claim 12 further characterized by said frame (42) including a plurality of circumferentially spaced support legs (64) extending longitudinally through said openings of said seal body (40) to distal ends (66) spaced longitudinally from said projections of said seal body (40) and said frame (42) and defining a receiving area therebetween.

14. The assembly of claim 13 further characterized by said retaining portion of said frame (42) comprising an annular flange (74) having at least one notch (80) through which the material of said connector (44) may flow during molding of the connector (44).

15. The assembly of claim 13 further characterized by a portion of said conduit (12) being disposed in abutting engagement with said distal ends (66) of said support legs (64).

16. The assembly of claim 15 further characterized by said conduit (12) including an inner tubular liner of low friction organic polymeric material, a plurality of long lay wires wrapped helically about said inner liner, and an outer sheath of organic polymeric material disposed about said long lay wires.

17. The assembly of claim 16 further characterized by said connector (44) being molded about and bonded to said outer sheath providing a water-tight interface therebetween.

* * * * *